United States Patent [19]

Haga et al.

[11] 4,294,795
[45] Oct. 13, 1981

[54] STABILIZED ELECTROCAST ZIRCONIA REFRACTORIES

[75] Inventors: Toshikatsu Haga; Hiroyuki Fukuda, both of Iwaki; Hiroshi Shinoda, Gifu; Hideharu Hayakawa, Nagoya, all of Japan

[73] Assignees: Kureha Kagaku Kogyo Kabushiki Kaisha, Tokyo; NGK Insulators, Ltd., Aichi, both of Japan

[21] Appl. No.: 116,409

[22] Filed: Jan. 29, 1980

Related U.S. Application Data

[63] Continuation-in-part of Ser. No. 45,687, Jun. 5, 1979, abandoned.

[30] Foreign Application Priority Data

Jun. 12, 1978 [JP] Japan .................................. 53-70529
Jun. 27, 1978 [JP] Japan .................................. 53-77837

[51] Int. Cl.$^3$ .............................................. C04B 35/48
[52] U.S. Cl. ...................... 264/332; 501/103; 501/104
[58] Field of Search ........................... 106/57; 264/332

[56] References Cited

U.S. PATENT DOCUMENTS

| | | | |
|---|---|---|---|
| 1,892,044 | 12/1932 | Eldred et al. | 164/126 |
| 2,602,708 | 7/1952 | Wheildon | 106/57 |
| 3,228,778 | 1/1966 | Walther | 106/57 |
| 3,519,448 | 7/1970 | Alper et al. | 106/57 |

Primary Examiner—John A. Parrish
Attorney, Agent, or Firm—Wegner & Bretschneider

[57] ABSTRACT

Stabilized zirconia refractories comprising fine block crystals of zirconia, having a high bulk density due to their dense texture and a higher bending strength than the conventional calcined zirconia refractories are disclosed. The stabilized electrocast zirconia refractories are obtained by pouring an electrofused melt of a blend of a zirconia-base material and a stabilizing agent into a mold and solidifying the poured melt from its lower portion by cooling the bottom part of the mold forcibly. Also the method for producing the stabilized electrocast zirconia refractories is disclosed.

12 Claims, 5 Drawing Figures

STABILIZED ELECTROCAST ZIRCONIA REFRACTORIES

CROSS-REFERENCE TO RELATED APPLICATION

This application is a continuation-in-part of our copending application Ser. No. 045,687, filed June 5, 1979 now abandoned.

SUMMARY OF THE INVENTION

In a first aspect of the invention, there is provided a stabilized elecrocast zirconia refractory which has a dense texture composed mostly of fine block crystals of zirconia and extremely high refractoriness and corrosion resistance and which has substantially no, or few in any, voids or cracks in the texture.

In a second aspect of the invention, there is provided a method of producing a stabilized electrocast zirconia refractory having the above-said properties.

DETAILED DESCRIPTION OF THE INVENTION

Figure 1:
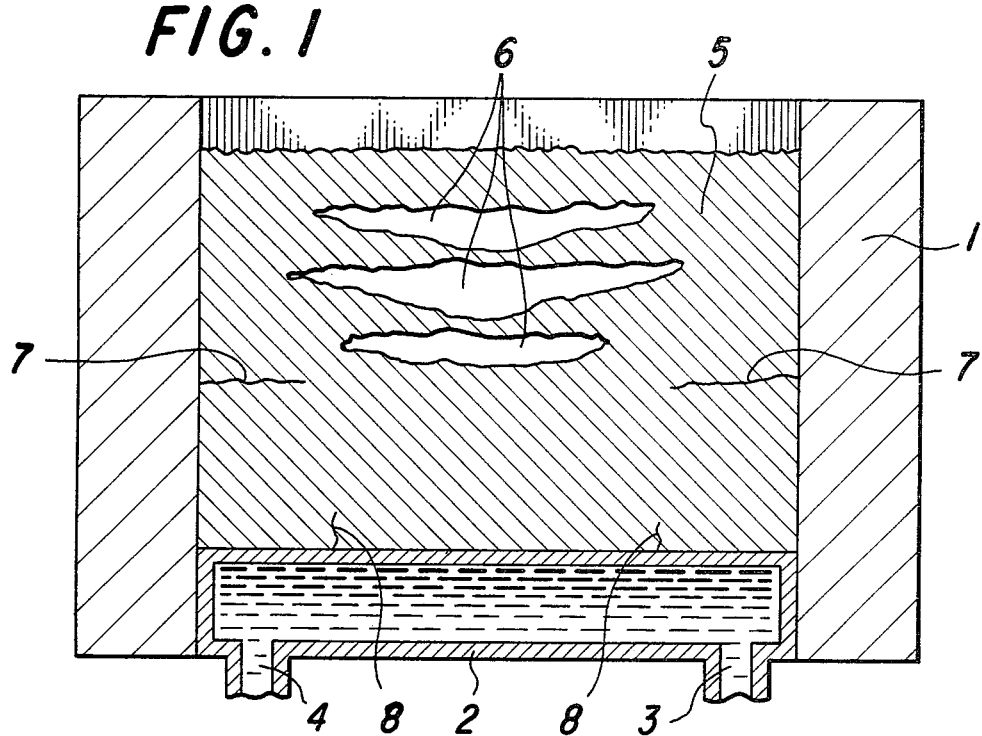
FIG. 1 of the accompanying drawings shows a state of a solidified mass of electrofused zirconia in a mold in one made of practice of this invention.

The present invention relates to the stabilized electrocast zirconia refractory with high strength which can be advantageously used for the refractory products which are required to have exceedingly high refractoriness and corrosion resistance, and a method of producing such refractories.

The heretofore known electrocast zirconia refractories are generally composed of a three-component system comprising zirconia ($ZrO_2$), alumina ($Al_2O_3$) and silica ($SiO_2$), said zirconia being usually contained in an amount of 10 to 30% by weight, and such refractories are mostly used for lining of the glass melting furnaces [refer to F. H. Norton "Refractories" page 186 (1968)]. These electrocast zirconia refractories are enhanced in glass corrosion resistance as the zirconia content increases, and owing to the progress of the electrical glass melting techniques in recent years, there has been made available the electrocast zirconia refractories containing zirconia in an amount of as much as about b 50% by weight.

However, no report has yet been made on successful obtainment of any practically acceptable electrocast refractory which is composed of zirconia alone and which is essentially different in crystal structure, and hence in properties, too, from said three-component electrocast zirconia refractories. This is due to the reason that the manufacture of the stabilized zirconia refractories is extremely difficult because of high melting point (above 2,500° C.) of zirconia (refer to U.S. Pat. No. 3,228,778, Col. 1, lines 41–71).

In view of high corrosion resistance and refactoriness of zirconia, we have attempted to produce a stabilized electrocast refractory from zirconia alone in the following way. Firstly, by applying the known techniques for manufacture of electrofused refractory, the zirconia material such as the electrofused or calcined grains of zirconia obtained from an ore of zirconium according to a usual method was electrofused in a self-or carbon-lined electric arc furnace, then the obtained melt was teemed into a mold having at its top a casting port, the casting being taken out of the mold after the casting surface has solidified, and the casting was immediately transferred into a thermal insulation and allowed to stand therein so that it was cooled very slowly over a long period of time. According to this method, however, many cracks developed in random directions in the solidified casting and there were also formed throughout the casting the voids originating from the bubbles in the electrical melt in the course of production of the casting. Further, the zirconia block crystals constituting the texture of the casting were relatively large in size. The product from this method was therefore quite unsatisfactory in strength.

It was thus found that use of the conventional techniques for manufacture of electrofused refractories can not lead to obtainment of a stabilized electrocast zirconia refractory which can be practically used for manufacture of the refractory products which are required to have exceedingly high strength such as lining of furnaces for super-high temperatures, setters for high-temperature calcination of ceramic materials or crucibles used for melting materials having a high melting point.

The inventors have found that in the case where an electrofused melt of a stabilized zirconia blend prepared by blending a zirconia-base material such as electrofused grains of zirconia or calcined grains of zirconia and a stabilizing agent is poured into a mold and said mold is forcibly cooled at its bottom part to solidify the melt from its lower portion, stabilized electrocast zirconia refractories having a dense texture consisting of fine block crystals of zirconia and having scarcely the voids and cracks within their texture are obtained.

The present invention is now described in detail. The term "stabilized electrocast zirconia refractories" is used in this specification to refer to the electrocast refractories which are obtained by electrofusing and casting a zirconia blend prepared by adding a stabilizing aent such as an alkaline earth metal compound (e.g. oxides of calcium or magnesium), or a rare earth compound to a zirconia material such as the electrofused or calcined grains of zirconia obtained from an ore of zirconium according to a usual method. An alkaline earth metal compound may be contained in said zirconia blend in an amount of 2.5 to 3.9% by weight as calculated in terms of its oxide. In case of using a rare earth compound, it may be contained in said blend in an amount of 5.5 to 8.0% by weight as calculated in terms of its oxide. Examples of the rare earth compounds usable in this invention are the oxides of such elements as yttrium, lanthanum, cerium, neodymium and the like. These oxides may be used either singly or in combination.

The stabilized electrocast zirconia refractories according to the present invention can be produced according to the below-described method from a zirconia blend admixed with an alkaline earth metal compound or a rare earth compound such as mentioned above as a stabilizing agent, and these refractories of the present invention are characterized by the following properties:

(1) They have a texture composed of block crystals of zirconia of sizes of less than about 400μ, and more than 50% of microscopically visual field, of the entire area is occupied by those block crystals of sizes less than 200μ.

(2) They have a bulk density of 5.0 to b 5.7 g/cm³ and an apparent porosity of less than 7% by volume.

(3) They show a bending strength of greater than 500 kg/cm² at room temperature.

In addition, the above-mentioned values of bulk density and apparent porosity were determined according to the method of Japanese Industrial Standard-R-2205, and that of bending strength was determined according to the method of Japanese Industrial Standard-R-2213.

Furthermore, the stabilized electrocast zirconia refractories according to the present invention have the following composition:

| Component | content (% by weight) |
|---|---|
| ZrO₂ | 89.0 to 97.5 |
| SiO₂ | preferably less than 1.0 |
| Al₂O₃ | less than 1.0 |
| Oxide of alkaline earth metal or | 2.5 to 3.9 as stabilizing agent |
| Oxide of rare earth | 5.5 to 8.0 as stabilizing agent |
| Others | less than 1.0 |

In the above-mentioned composition, if the content of the stabilizing agent is larger than the above-mentioned range, the whole texture becomes glassy and brittle, resulting poor product strength, while if the content of stabilizer is lower than the defined range, large cracks develope due to transformation of the zirconia crystals.

For reference, the results of the determination of the physical properties of the conventional calcined zirconia refractories are illustrated, for instance, as follows:

| Bulk density | 4.60 g/cm³ |
|---|---|
| Apparent porosity | 18% by volume, and |
| Bending strength | 120 kg/cm². |

The above-mentioned calcined zirconia refractories were obtained by the steps of crushing the fused stabilized zirconia, of admixing a binder, of formulating the mixture in a shape, of drying the shaped formulation and of calcining the dried shaped formulation. By the way, the method of preparation of the above-mentioned calcined zirconia refractories will be described in detail in Comparative Example 1.

The following is the explanation of the method for preparation of the stabilized electrocast zirconia refractories according to the present invention:

At first, a stabilized zirconia blend is prepared by adding as a stabilizing agent an alkaline earth metal compound or a rare earth compound such as above-mentioned to a zirconia-base material such as fused or calcined grains of zirconia. Usually, limestone or magnesium carbonate is used as the alkaline earth metal compound, and such material is contained in said stabilized zirconia blend in an amount of 2.5 to 3.9% by weight as calculated in terms of oxide. In case of using a rare earth compound as stabilizing agent, an oxide of a rare earth element such as mentioned above is contained in said blend in an amount of 5.5 to 8.0% by weight. Since commercial yttrium oxides usually contain oxides of other rare earth elements, use of such yttrium oxides is practically advantageous in case of employing a rare earth compound as stabilizing agent.

The thus prepared stabilized zirconia blend is fused in a usual way by using an electric furnace, preferably a tiling type, and teemed into a mold in the form of a melt.

The characteristic of the method of the present invention resides in that said electrofused melt of a stabilized zirconia blend is teemed into a mold and the mold is forcibly cooled from its bottom. According to another mode of this invention, said melt is teemed into a mold which is forcibly cooled from its bottom and in the course of solidification of the melt, the casting is turned upside-down before any crack develops in the bottom portion of the casting, and the casting is cooled down to normal temperature under this condition.

As mentioned before, in order to obtain stabilized electrocast zirconia refractories with a dense texture and high strength, it is essential to prevent formation of cracks in random directions as well as voids throughout the casting.

When the mold is forcibly cooled from its bottom during casting of said electrofused melt according to the present invention the melt which is quickly cooled from its bottom surface begins to solidify and crystallizes from its bottom, and the voids due to bubbles in the melt, which are formed in the lower portion of the casting earlier, where crystallization takes place, migrate to and concentrate in the upper portion of the casting where crystallization takes place later on. This phenomenon is attributable to the migration of the bubbles in the melt from the portion at lower temperatures to the portion at higher temperatures. The size of the zirconia block crystals formed as a result of said crystallization is finer in the lower half portion of the solidified mass as it is forcibly cooled from the bottom during solidification, but the upper half portion where forced cooling is not applied is composed of coarser block crystals. Therefore, by cutting out the upper half portion of the produced casting, one can obtain a casting having a dense texture composed of fine zirconia block crystals.

In the above-mentioned casting process by forced cooling, cracks develope in the solidified mass owing to a large temperature difference between the bottom portion and both side portions of the mold, but since forced cooling is applied only to the bottom portion of the mold, large cracks develope horizontally only at a location slightly below the center in the vertical length, with only small cracks developing vertically from the bottom surface. Therefore, if the solidified product is taken out of the mold after cooling to normal temperature and the portion thereof upward of said horizontal large cracks, or the portion having many voids formed therein, is cut out, there can be obtained an electrocasting which has almost no voids nor any large cracks. Further, when the thus obtained electrocasting is cut along the direction of the small vertical cracks from the bottom surface thereof to form a longitudinally elongated rectangular parallelepiped, it is possible to obtain an electrocast refractory which is substantially free of cracks.

Now, the patterns, of formation of the voids and cracks in the course of electrocasting according to the method of the present invention are explained with reference to the accompanying drawings.

Figure 2:
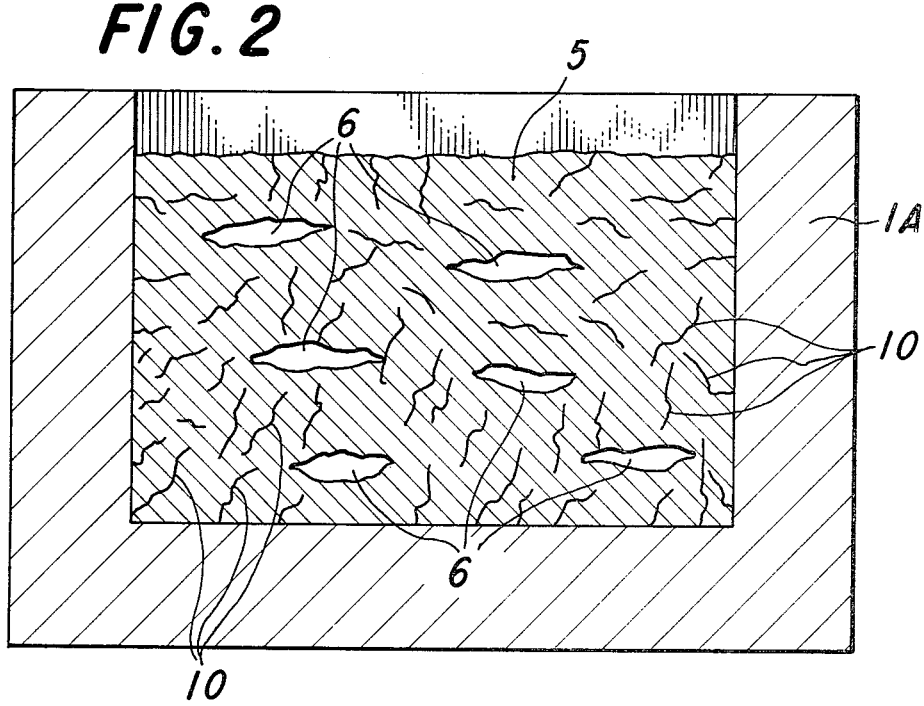
FIG. 2 shows a similar state of a solidified mass as formed according to a conventional method.

FIG. 1 shows diagrammatically a state of a solidified mass formed according to the method of the present invention, and FIG. 2 shows a similar state of a solidified mass formed according to a known method.

In FIG. 1, reference numeral 1 indicates a mold having disposed at its bottom a water-cooling basin 2. Cooling water is supplied into said basin 2 from a water feed port 3 and discharged out from a discharge port 4. When an electrofused melt is teemed into the mold 1 while supplying cooling water into said basin 2, said melt is forcibly cooled from its bottom portion and solidified to form a mass 5. The voids 6, 6, . . . formed in the course of solidification concentrate in the upper portion of the mass, while large horizontal cracks 7, 7 develop in the central portion and small vertical cracks 8, 8 are formed in the bottom portion of the mass.

In FIG. 2, reference numeral 1A indicates a mold. When an electrofused melt is teemed into the mold 1, said melt is naturally cooled and solidified to form a mass 5. The voids 6, 6, . . . form in the course of solidification and scatter in the mass, while irregular cracks 10, 10, . . . develop in the mass.

When the melt in the mold is quickly and forcibly cooled and solidifies from its bottom portion according to another mode of practice of the present invention, the voids formed in such operation are seen concentrated in the upper portion of the solidified mass, so at this point of time when no crack yet developes in the lower portion of the solidified mass, said mass is turned upside-down and cooled slowly down to normal temperature, whereby since voids present in the lower side portion of the solidified mass where cooling is applied under a heavily loaded condition, the cracks which develop resultantly from thermal stress concentrate in the lower portion. On the other hand, almost no formation of crack is seen in the upper portion of the solidified mass which remains free of any influence of stress which builds up between the bottom of the mold and the solidified mass due to its own weight and thermal shrinkage. Therefore, by cutting out the lower portion of the solidified mass where the voids and cracks present in a concentrated state, there can be obtained an electrocasting which has a dense texture mostly composed of fine zirconia block crystals and which is also substantially free from voids and cracks.

Now, the patterns of generation of the voids and cracks in the above-mentioned electrocasting process according to the present invention will be explained with reference to the accompanying drawings.

Figure 3:
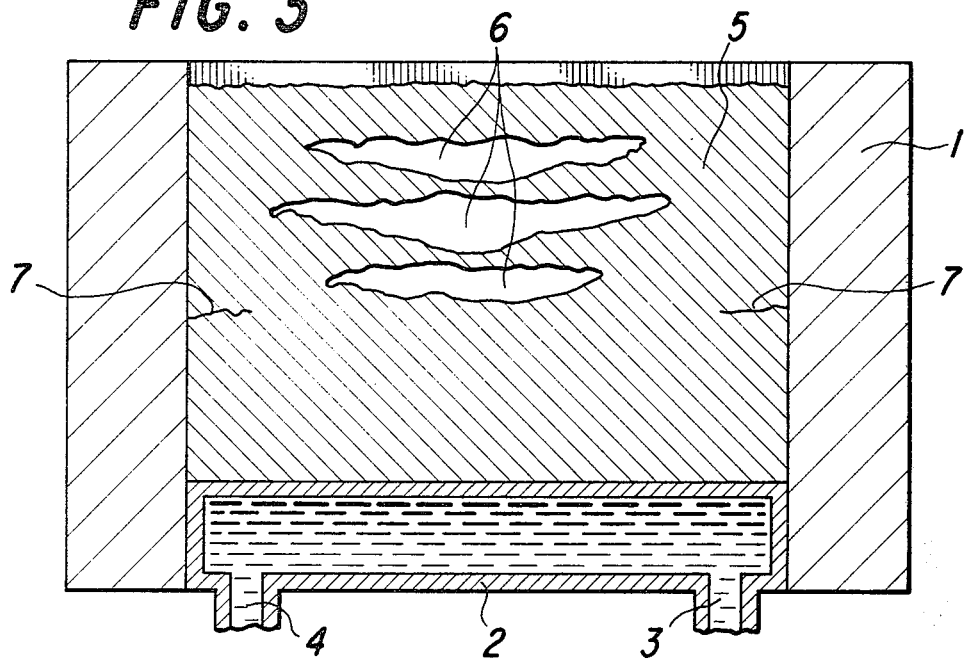
FIGS. 3 to 5 show the states of a solidified mass of electrofused zirconia in a mold according to another mode of practice of this invention.

Referring to FIG. 3, a state of the voids formed in the course of solidification of the electrofused melt teemed into a mold is shown. In FIG. 3, numeral 1 refers to a mold having a water cooling basin 2 at its bottom, said basin 2 having a water inlet port 3 for supplying cooling water into the basin and an outlet port 4 for discharging out the cooling water.

Figure 4:
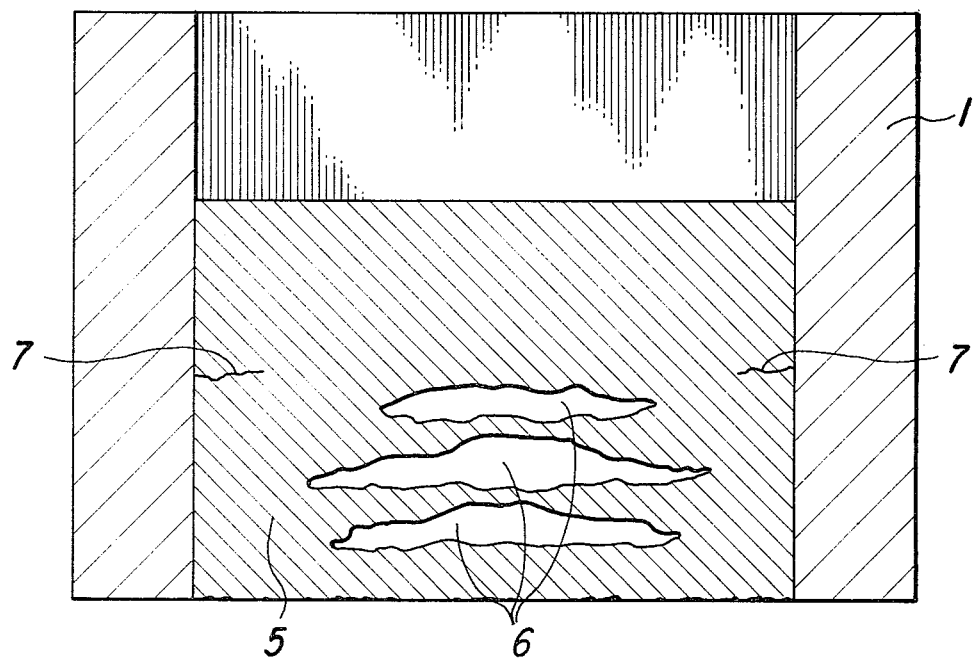

When the melt is teemed into the mold 1 while supplying cooling water into the basin 2, the voids 6, 6, . . . form in accordance with solidification of the melt but they concentrate in the upper portion of the solidified mass 5. So, supply of cooling water into the basin 2 is stopped at this point and while no crack yet develop in the lower portion of the mass 5, the mold 1 (which still contains the mass 5) is half-turned into the state of FIG. 4 by using, for example, a mold-reversing device utilizing a manual handle and a gear transmission mechanism. The reference numerals in FIG. 4 correspond to those of FIG. 3. Letters 7, 7, in FIGS. 3 and 4 show the large horizontal cracks which generated in the course of formation of the solidified mass.

Figure 5:
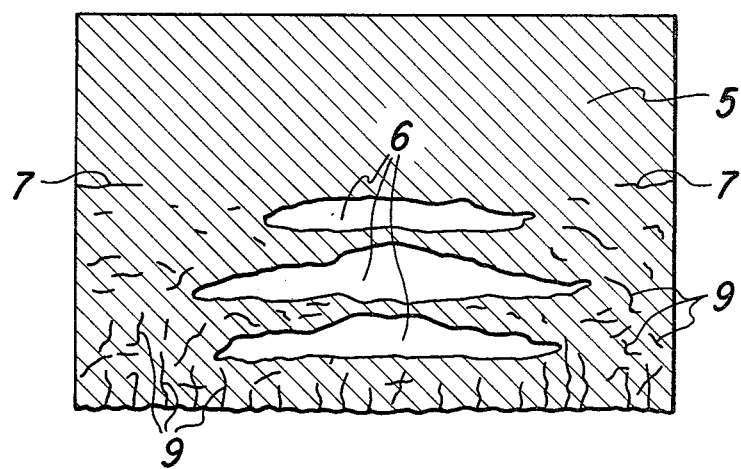

After half-turning the mold 1, the water basin 2 is removed and the casting (solidified mass) 5 is left at it is or removed from the mold into a separately provided thermal insulation (not shown) and allowed to stand as it is to cool slowly to normal temperature, consequently obtaining a casting 5 having state such as shown in FIG. 5. Letters 9, 9, . . . in FIG. 5 show a plurality of cracks which developed in random directions during the above-mentioned slow cooling. Other denotations correspond to those of FIG. 4.

Reflection microscopical observation of the polished samples of the electrocast zirconia refractories obtained according to the described method of the present invention reveals that they have a texture of which more than 50% of the visual field is composed of the block crystals with fine sizes of less than $200\mu$ as further described in the ensuing Examples. Also, the samples prepared by cutting the product into the size of 20 mm$\times$20 mm$\times$150 mm by a diamond cutter showed a bending strength of over 500 kg/cm$^2$ as measured at room temperature while supporting each sample at three points with span of 120 mm.

In addition, the electrocast zirconia refractories obtained according to the method of the present invention have, as mentioned above, a bulk density of 5.0 to 5.7 g/cm$^3$, an apparent porosity of less than 7% by volume and a composition above-mentioned.

As has been described, according to the present invention, the stabilized electrocast zirconia refractories having an extremely dense texture without any voids and cracks, and a high strength are possibly offered.

The invention is now described in further detail by way of the following examples.

EXAMPLE 1

The calcined grains of zirconia and limestone were mixed in the weight ratio of 96.5:3.5 (calculated in terms of oxides) and electrofused in a 1,000 KVA Heroult type electric arc furnace, and the melt was teemed into a carbon-lined mold (internal dimensions of 500 mm$\times$500 mm$\times$500 mm) having at its bottom a water-cooling basin made of thick steel plates provided with a water-cooling hose. After cooling for 18.5 hours, the casting was taken out of the mold and left on a flat carbon plate to cool naturally for 24 hours, thereby obtaining a casting with height of 350 mm. Then, the upper portion of this casting was cut out at 150 mm in height by a diamond cutter and the remaining lower portion was given as product.

The chemical composition of the thus obtained product was as follows:

| Component | Content (% by weight) |
|---|---|
| ZrO$_2$ | 95.9 |
| SiO$_2$ | 0.32 |
| CaO | 3.30 |
| Fe$_2$O$_3$ | 0.10 |
| TiO$_2$ | 0.15 |
| Al$_2$O$_3$ | 0.20 |

Three samples of an equal size of 20 mm$\times$20 mm$\times$150 mm were cut out from the above product by using a diamond cutter, and the bending strength of these samples was measured at room temperature by supporting each sample at three points with span of 120 mm. The mean value of the bending strength was 650 kg/cm$^2$ (determined according to the method of Japanese Industrial Standard-R-2213).

Also, polished samples were prepared from the same product and the crystal state of these samples was observed by a reflection microscope. It was found that each of said samples was composed of block crystals with sizes of less than about 400μ, and about 60 to 70% of the entire area of the visual field under the microscope was occupied by the crystals with sizes of less than 200μ.

The bulk density and the apparent porosity of the thus obtained stabilized electrocast zirconia refractories were:

| | |
|---|---|
| Bulk density | 5.50 g/cm³ and |
| Apparent porosity | 2% by volume, | determined according to the method of Japanese Industrial Standard-R-2205.

COMPARATIVE EXAMPLE 1

A fused stabilized zirconia of the following composition was prepared by fusing a mixture of siliceous ores in an electric arc fusion process:

| Component | Composition (% by weight) |
|---|---|
| $ZrO_2$ | 94 |
| CaO | 4 |
| $SiO_2$ | 0.14 |
| $Fe_2O_3$ | 0.2 |
| $TiO_2$ | 0.22 |

After crushing, grinding and grading the above-mentioned stabilized zirconia, dextrine and water were admixed with the zirconia, and the mixture was formulated in a shape by dry-pressing under the pressure of 800 kg/cm². After drying the formulated material, it was calcined at a temperature of 1,770° to 2,000° C. The bulk density, apparent porosity and bending strength of the thus obtained calcined zirconia refractories, determined by the method described in Example 1, were as follows:

| | |
|---|---|
| Bulk density | 4.60 g/cm³ |
| Apparent porosity | 18% by volume, and |
| Bending strength | 120 kg/cm². |

In use of the produced stabilized electrocast zirconia refractories (500 mm×500 mm×200 mm in dimensions) according to Example 1 for a super-high temperature oil cracking furnace, the refractory life was more than one year as compared to the average 6-month life of the conventional high-temperature calcined zirconia refractories produced by Comparative Example.

EXAMPLE 2

Electrofused grains of zirconia and magnesia were mixed in the weight ratio of 96.2:3.8 (calculated in terms of oxides) and electrofused, and the melt was teemed into a mold at its bottom according to the same procedures as described in Example 1, and after cooling for 11.5 hours, the casting was taken out of the mold and left on a flat plate to cool for 24 hours to obtain a casting with height of 350 mm. Then, the upper portion of this casting was cut out at 150 mm in height by a diamond cutter and the remaining lower portion was cut vertically into a 50 mm×50 mm×150 mm longitudinally rectangular parallelpiped, and the latter was given as product.

The thus obtained product had the following chemical composition:

| Component | Composition (% by weight) |
|---|---|
| $ZrO_2$ | 95.6 |
| $SiO_2$ | 0.32 |
| MgO | 3.60 |
| $Fe_2O_3$ | 0.10 |
| $TiO_2$ | 0.15 |
| $Al_2O_3$ | 0.20 |

The crystal size, bulk density, apparent porosity and bending stength of the above-mentioned product, determined by the method described in Example, were as follows:

| | |
|---|---|
| Crystal size | The area of the crystals having sizes of less than 200μ occupied about 55% of microscopically visual field of the entire area. |
| Bulk density | 5.45 g/cm³, |
| Apparent porosity | 2.5% by volume, and |
| Bending strength | 540 kg/cm². |

When the thus obtained stabilized electrocast zirconia refractories were used for a super-high temperature oil cracking furnace in the same way as described in Example 1, the refractory life proved to be more than one year as compared to the average 3-month life of the conventional high-temperature calcined zirconia refractories, produced by comparative Example 1.

EXAMPLE 3

Calcined grains of zirconia and yttria were mixed together in the weight ratio of 92.5:7.5 (calculated in terms of oxides) and electrofused in a 1,000 KVA Heroult type electric arc furnace, and the melt was teemed into a carbonlined mold (500 mm×500 mm×500 mm in internal measurement) having at its bottom a water-cooling basin constituted from thick steel plates provided with a water-cooling hose. This was followed by 2-hour cooling, and after the voids developed in the upper portion, the casting was taken out of the mold, turned upsidedown and left in an thermal insulation to cool for 72 hours, thereby obtaining a casting with height of 350 mm. Then, the portion of the casting where voids were formed was at a height of 150 mm cut out by a diamond cutter and the remaining portion was given as the product.

The thus obtained product had the following chemical composition:

| Component | Composition (% by weight) |
|---|---|
| $ZrO_2$ | 9.15 |
| $SiO_2$ | 0.62 |
| $Y_2O_3$ | 7.40 |
| $Fe_2O_3$ | 0.13 |
| $TiO_2$ | 0.11 |
| $Al_2O_3$ | 0.19 |

The crystal size, bulk density, apparent porosity and bending stength of the above-mentioned product, determined by the method described in Example 1, were as follows:

| | |
|---|---|
| Crystal size | The area of the crystals having the representative dimension of less than 200μ occupied about 70% of microscopically visual field of the entire area. |
| Bulk density | 5.40 g/cm$^3$, |
| Apparent porosity | 2.5% by volume and |
| Bending strength | 580 kg/cm$^2$. |

When the thus obtained stabilized electrocast zirconia refractories (500 mm×500 mm×200 mm in dimensions) were used for a superhigh temperature oil cracking furnace as described in Example 1, the refractories showed the life of more than two years as compared with the average 6-month life of the conventional high-temperature calcined zirconia refractories produced by Comparative Example 1.

COMPARATIVE EXAMPLE 2

The present comparative example shows the results of comparison of the properties and performances between the publicly known conventional fused-cast zirconia refractories and the stabilized electrocast zirconia refractories of the present invention.

As the publicly known conventional fused-cast zirconia refractories, those prepared by the procedures described in (a) U.S. Pat. No. 3,228,778 (Example III) and in (b) "Refractories" (1968) by F. H. Norton, pages 186 to 187, respectively, were adopted.

Methods of preparation (a) A batch was prepared containing 94% zirconia stabilized with CaO, 5% of zircon, 1% of titania, and 0.1% of boric acid. The batch was formed into a shape. The resulting shape had a bulk density of 5.38 g/cm$^3$. The resulting shape was healed at a temperature of about 1,200° C. for a period of 45 minutes. The shape was removed from the bath and examined.

(b) A zirconia-containing block consisting of 35% of ZrO$_2$, 48% of Al$_2$O$_3$ and the remainder of SiO$_2$, TiO$_2$ and Fe$_2$O$_3$ and alkalies, was fused in an electric furnace. The thus obtained fused zirconia composition was poured into a mold, where the pouring temperature for the fused zirconia composition was 1,800° C. The cooling of the mold was slow, taking several days.

Chemical compositions of the refractories prepared by (a) and (b), respectively, and of the stabilized electrocast zirconia refractories prepared by the processes described in Example 1, and their heat-resistant properties are shown below:

| | Refractories | | |
|---|---|---|---|
| Composition (% by weight) | of the present invention | by (a) | by (b) |
| ZrO$_2$ | 95.9 | 91.8 | 30 |
| SiO$_2$ | 0.32 | 2.1 | 25 |
| Al$_2$O$_3$ | 0.20 | 0.20 | 45 |
| CaO | 3.30 | 4.9 | — |
| TiO$_2$ | 0.15 | 1.00 | — |
| B$_2$O$_3$ | — | 0.05 | — |

Heat-resistant Test

Cut specimens of each of the above-mentioned three different products, having a dimension of 200 mm×100 mm×50 mm, were placed in an electric furnace, and heated to temperatures of 1,800° and 2,000° C., respectively, at a rate of temperature raising of 80° C./hour, and after keeping them at the respective temperatures for 3 hours they were cooled to the room temperature, and their appearance was observed. The results are shown in the following table:

TABLE

| | Temperature (max.) | |
|---|---|---|
| Specimen | 1,800° C. | 2,000° C. |
| The product according to the present invention | Normal (no change observed) | Normal (no change observed) |
| The product according to (a) | Sintered | Melted |
| The product according to (b) | Melted | Melted |

What is claimed is:

1. A method for producing a stabilized electrocast zirconia refractory having a bending strength of over 500 kg/cm$^2$ at room temperature and containing less than 1% each of TiO$_2$, Al$_2$O$_3$ and SiO$_2$, which comprises the steps of:

blending a zirconia base material and a stabilizing agent selected from the group consisting of alkaline earth metal compounds and rare earth compounds, electrofusing the thus formed mixture thereby obtaining a stabilized molten zirconia blend, pouring said stabilized molten zirconia blend into a mold, letting said melt solidify from its lower portion by cooling forcibly the bottom of the mold, and cutting out the portion of the solidified mass where voids were formed, thus obtaining said stabilized electrocast zirconia refractory.

2. A method according to claim 1, wherein said stabilized zirconia blend contains an alkaline earth metal oxide as a stabilizing agent in an amount of 2.5 to 3.9% by weight.

3. A method according to claim 2, wherein said alkaline earth metal oxide is selected from the group consisting of calcium oxide and magnesium oxide.

4. A method according to claim 1, wherein said stabilized zirconia blend contains an oxide of a rare earth element as a stabilizing agent in an amount of 5.5 to 8.0% by weight.

5. A method according to claim 4, wherein said oxide of a rare earth element is an oxide of yttrium.

6. A method according to claim 1, wherein forced cooling of the mold bottom is performed by circulating cooling water to the bottom of the mold.

7. A method for producing a stabilized electrocast zirconia refractory having a bending strength of over 500 kg/cm$^2$ at room temperature and containing less than 1% each of TiO$_2$, Al$_2$O$_3$ and SiO$_2$, which comprises the steps of:

blending a zirconia base material and a stabilizing agent selected from the group consisting of alkaline earth metal compounds and rare earth compounds, electrofusing the thus formed mixture thereby obtaining a stabilized molten zirconia blend, pouring said stabilized molten zirconia blend into a mold, letting said melt solidify from its lower portion by cooling forcibly the bottom of the mold, turning the obtained solidified mass upsidedown at the time when voids have been formed in the upper portion of the solidified mass but no crack has yet formed in the lower portion thereof, and cutting out the portion of the solidified mass where voids formed, thus obtaining said stabilized electrocast zirconia refractory.

8. A method according to claim 7, wherein said stabilized zirconia blend contains an oxide of an alkaline earth metal as a stabilizing agent in an amount of 2.5 to 3.9% by weight.

9. A method according to claim 8, wherein said alkaline earth metal oxide is selected from the group consisting of calcium oxide and magnesium oxide.

10. A method according to claim 7, wherein said stabilized zirconia blend contains a rare earth oxide as a stabilizing agent in an amount of 5.5 to 8.0% by weight.

11. A method according to claim 10, wherein said rare earth oxide is an oxide of yttrium.

12. A method according to claim 7, wherein forced cooling of the bottom of mold is performed by circulating cooling water to the bottom of the mold.

* * * * *